US011420283B2

(12) United States Patent
Albrecht et al.

(10) Patent No.: US 11,420,283 B2
(45) Date of Patent: Aug. 23, 2022

(54) INCREMENTAL HYBRID WELDING SYSTEMS AND METHODS

(71) Applicant: Illinois Tool Works Inc., Glenview, IL (US)

(72) Inventors: Bruce Patrick Albrecht, Neenah, WI (US); Allen Raymond Sykes, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 305 days.

(21) Appl. No.: 16/601,248

(22) Filed: Oct. 14, 2019

(65) Prior Publication Data

US 2020/0130091 A1    Apr. 30, 2020

Related U.S. Application Data

(63) Continuation of application No. 16/154,091, filed on Oct. 8, 2018, now Pat. No. 10,442,026, which is a
(Continued)

(51) Int. Cl.
*B23K 9/00* (2006.01)
*B23K 9/06* (2006.01)
(Continued)

(52) U.S. Cl.
CPC ............. *B23K 9/1012* (2013.01); *B23K 9/06* (2013.01); *B23K 9/09* (2013.01); *B23K 9/095* (2013.01); *B23K 9/1006* (2013.01)

(58) Field of Classification Search
CPC . B23K 9/00; B23K 9/09; B23K 9/095; B23K 9/1106; B23K 9/1075; B23K 11/24; B23K 13/08; B23K 37/0258
(Continued)

(56) References Cited

U.S. PATENT DOCUMENTS 3,365,644 A * 1/1968 Smallman ............... B23K 9/201
   320/116
4,590,357 A * 5/1986 Winkler ............... B23K 9/1081
   219/130.1
(Continued)

FOREIGN PATENT DOCUMENTS

EP           1852206       11/2007
JP       H05318117 A      12/1993
(Continued)

OTHER PUBLICATIONS

ARC MFG; "Panel Beater"; http://www.arcmfg.com/arcmfg/brochurepagetwo.html; Feb. 20, 2008, 1 pg.
(Continued)

*Primary Examiner* — Michael A Laflame, Jr.
(74) *Attorney, Agent, or Firm* — McAndrews, Held & Malloy, Ltd.

(57) ABSTRACT

Embodiments of a welding power supply include an engine adapted to drive a generator to produce a first power and a energy storage device adapted to discharge energy to produce a second power. The welding power supply also includes control circuitry adapted to detect a commanded output. The control circuitry is adapted to meet the commanded output by controlling access to power from the energy storage device to produce the second power when the commanded output is below a first predetermined load level. The control circuitry is further adapted to meet the commanded output by controlling access to power from the engine and the energy storage device to produce the first power and the second power when the commanded output is above a second predetermined load level.

20 Claims, 4 Drawing Sheets

Related U.S. Application Data continuation of application No. 14/066,305, filed on Oct. 29, 2013, now Pat. No. 10,092,971, which is a continuation of application No. 12/894,038, filed on Sep. 29, 2010, now Pat. No. 8,569,652.

(60) Provisional application No. 61/261,960, filed on Nov. 17, 2009.

(51) Int. Cl.
| | | |
|---|---|---|
| *B23K 11/24* | (2006.01) | |
| *B23K 13/00* | (2006.01) | |
| *B23K 9/10* | (2006.01) | |
| *B23K 9/09* | (2006.01) | |
| *B23K 9/095* | (2006.01) | |

(58) Field of Classification Search
USPC ..................................... 219/108, 130.1–134
See application file for complete search history.

(56) References Cited

U.S. PATENT DOCUMENTS

| | | | | |
|---|---|---|---|---|
| 4,705,934 A * | 11/1987 | Winkler | ............... | B23K 9/1006 219/130.1 |
| 4,801,780 A * | 1/1989 | Hayes | .................. | B23K 9/1336 219/130.1 |
| 5,086,208 A * | 2/1992 | Habermann | ......... | B23K 9/1333 219/130.1 |
| 5,198,698 A * | 3/1993 | Paul | .......................... | H02J 9/08 307/64 |
| 5,233,159 A * | 8/1993 | Day | ..................... | B23K 9/1006 219/130.1 |
| 5,250,786 A * | 10/1993 | Kikuchi | .................. | H02J 9/066 219/130.32 |
| 5,410,126 A * | 4/1995 | Miller | .................. | B23K 9/1043 219/130.1 |
| 5,736,711 A * | 4/1998 | Joos | ..................... | B23K 9/0061 219/132 |
| 5,991,169 A * | 11/1999 | Kooken | .............. | H02M 1/4208 363/17 |
| 5,993,983 A * | 11/1999 | Rozon | ................. | H01M 10/122 429/9 |
| 6,066,834 A * | 5/2000 | Rebold | .................... | B23K 9/12 219/137.71 |
| 6,111,215 A * | 8/2000 | Lilly | .................... | B23K 9/1006 219/130.51 |
| 6,175,217 B1 * | 1/2001 | Da Ponte | ................ | H02J 9/066 322/19 |
| 6,225,596 B1 * | 5/2001 | Chandler | ............. | B23K 9/1056 219/130.1 |
| 6,331,694 B1 * | 12/2001 | Blankenship | ............ | B23K 9/16 219/137 PS |
| 6,512,201 B2 | 1/2003 | Blankenship | | |
| 6,621,050 B2 * | 9/2003 | Plantz | .................. | B23K 9/1006 219/133 |
| 6,653,596 B2 | 11/2003 | Blankenship | | |
| 6,747,246 B2 * | 6/2004 | Crandell, III | ........... | H02J 9/005 219/130.1 |
| 6,777,649 B2 * | 8/2004 | Reynolds | ............. | B23K 9/1081 219/130.1 |
| 6,818,860 B1 * | 11/2004 | Stava | ................... | B23K 9/1006 219/130.1 |
| 6,962,398 B2 * | 11/2005 | Okuda | ................. | B41J 2/04516 347/10 |
| 6,982,398 B2 | 1/2006 | Albrecht | | |
| 7,183,517 B2 * | 2/2007 | Albrecht | .............. | B23K 9/1056 219/130.4 |
| 7,202,636 B2 * | 4/2007 | Reynolds | ............ | H02M 1/4208 320/166 |
| 2005/0224478 A1 * | 10/2005 | Stropki | ................ | B23K 9/1006 219/125.1 |
| 2005/0263514 A1 * | 12/2005 | Albrecht | .............. | B23K 9/1006 219/133 |
| 2006/0027548 A1 * | 2/2006 | Albrecht | .............. | B23K 9/1006 219/133 |
| 2006/0033473 A1 * | 2/2006 | Stanzel | ..................... | H02J 7/02 320/128 |
| 2006/0037953 A1 * | 2/2006 | Matthews | ............ | B23K 9/1081 219/133 |
| 2007/0181547 A1 * | 8/2007 | Vogel | ................... | B23K 9/1081 219/130.1 |
| 2007/0187376 A1 | 8/2007 | Albrecht | | |
| 2007/0215585 A1 * | 9/2007 | O'Connor | ............ | B23K 9/1081 219/130.1 |
| 2007/0251931 A1 | 11/2007 | Lambirth | | |
| 2007/0257084 A1 * | 11/2007 | Carrier | ..................... | B23K 9/10 228/44.3 |
| 2007/0278993 A1 * | 12/2007 | Vogel | ................... | B23K 9/1081 320/107 |
| 2008/0083705 A1 * | 4/2008 | Peters | .................... | B23K 9/091 219/61 |
| 2008/0264922 A1 * | 10/2008 | Fosbinder | ............... | F02B 63/02 219/133 |
| 2008/0314885 A1 * | 12/2008 | Hutchison | ............ | B23K 9/1043 219/133 |

FOREIGN PATENT DOCUMENTS

| | | |
|---|---|---|
| JP | 6087082 | 3/1994 |
| JP | 6182548 A | 7/1994 |
| WO | 2008156946 | 12/2008 |

OTHER PUBLICATIONS

Go Weld; Broco, Inc.; "Product Information/Specifications"; http://www.goweld.com/prodinfo.html; Feb. 14, 2008; pp. 1-2.

GoWeldinst; Broco Go Weld; "Operating Instructions Manual"; 2002, pp. 1-43.

International Search Report for application No. PCT/US2010/056756 dated Mar. 21, 2011.

MQ Multiquip; "180 Amp Battery-Powered Welder"; www.multiquip.com; Jan. 2008; 2 pgs.

Ready Welder Corporation; "Ready Welder II—Operation Manual"; Battery/DC Powered Portable MIG Welder and Spool Gun; www.readywelder.com; pp. 1-20.

ReadyWelder; "Ready Welder II Worlds Most Portable MIG Welder!"; http://www.readywelder.com/home.html; Feb. 14, 2008, pp. 1-4.

\* cited by examiner

INCREMENTAL HYBRID WELDING SYSTEMS AND METHODS

CROSS REFERENCE TO RELATED APPLICATIONS

This application is a Continuation patent application of U.S. Non-Provisional application Ser. No. 16/154,091, entitled "Incremental Hybrid Welding Systems and Methods", filed Oct. 8, 2018, now U.S. Pat. No. 10,442,026 and U.S. Non-Provisional application Ser. No. 14/066,305, entitled "Incremental Hybrid Welding Systems and Methods", filed Oct. 29, 2013, now U.S. Pat. No. 10,092,971 and U.S. Non-Provisional application Ser. No. 12/894,038, filed Sep. 29, 2010, entitled "Incremental Hybrid Welding Systems and Methods" now U.S. Pat. No. 8,569,652, which are Non-Provisional patent applications of U.S. Provisional Patent Application No. 61/261,960 entitled "Incremental Hybrid", filed Nov. 17, 2009, all of which are herein incorporated by reference in their entirety.

BACKGROUND

The invention relates generally to welding systems, and, more particularly, to hybrid welding systems.

Welding is a process that has become increasingly ubiquitous in various industries and applications. As such, a variety of welding applications, such as construction and shipbuilding, may require welding devices that are portable and can easily be transported to a remote welding location. Accordingly, in some cases, it is often desirable for such welding devices to be operable as standalone units remote from a power grid or other primary power source. Therefore, a variety of welding systems utilizing alternate power sources, such as batteries, have been developed. Furthermore, during a welding operation, some weld load demands may be small (e.g., below 150 amps), and to meet such small load demands, the engine-generator unit is activated. However, activation of the engine-generator to meet such small load demands is often inefficient. Accordingly, there exists a need for hybrid welding systems that overcome such drawbacks.

BRIEF DESCRIPTION

In an exemplary embodiment, a welding system includes an engine adapted to drive a generator to produce a first power output, wherein the engine is rated below approximately 25 horsepower. The welding system further includes a battery adapted to discharge energy to produce a second power output and a charger coupled to the battery and to the engine and adapted to receive power from the engine and to charge the battery with the received power. The welding system also includes a controller adapted to control access to power from the battery to produce the second power output when a commanded output is less than or equal to a first threshold, to activate the engine to produce the first power output when the commanded output is between the first threshold and a second threshold, and to activate both the battery to produce the second power output and the engine to produce the first power output when the commanded output is greater than or equal to the second threshold.

In another embodiment, a welding power supply includes an engine adapted to drive a generator to produce a first power and a battery adapted to discharge energy to produce a second power. The welding power supply also includes control circuitry adapted to detect a commanded output and to meet the commanded output by controlling access to power from the battery to produce the second power when the commanded output is below a first predetermined load level and to meet the commanded output by controlling the engine-generator and the battery to produce the first power and the second power when the commanded output is above a second predetermined load level.

In another embodiment, a method of controlling a hybrid welding system includes determining a commanded output of the hybrid welding system, activating an engine-generator unit to produce a first power output substantially equal to the commanded output when the commanded output level is below the first threshold, and activating the battery and the engine-generator unit to produce a combined power output substantially equal to the commanded output level when the commanded output level is greater than or equal to the first threshold.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of an incremental hybrid welding system and methods of controlling such a system are provided. Embodiments of the hybrid welding system may be adapted to provide output power to meet small load requirements (e.g., less than approximately 150 amps) commanded by an operator without activation of an engine-generator unit disposed therein. For example, the hybrid welding system may include an energy storage device (e.g., a battery, a capacitor, etc.) coupled to an associated converter and capable of meeting small commanded output requirements. Indeed, although embodiments of the present invention are described below in the context of a battery based system, additional embodiments may include any of a variety of suitable energy storage devices, such as capacitors, fuel cells, etc. Furthermore, embodiments of the disclosed hybrid welding systems may include engines with ratings below approximately 22 horsepower (hp), approximately 23 hp, approximately 24 hp, or approximately 25 hp but may still be capable of producing output power to meet large load commands (e.g., above approximately 250 amps) by combining output power from both one or more batteries and the engine-generator unit. For further example, in some embodiments, embodiments of the hybrid welding systems may include engines with ratings between approximately 12 hp and approximately 16 hp, which may operate up to approximately 180 amps without energy storage device power and up to between approximately 250 amps and approximately 300 amps with energy storage device supplemental power. Furthermore, the incremental hybrid welding system may include a charger configured to recharge the one or more batteries with output power from the engine-generator unit and a controller adapted to control the access to power from the one or more batteries and the engine-generator unit.

Figure 1:
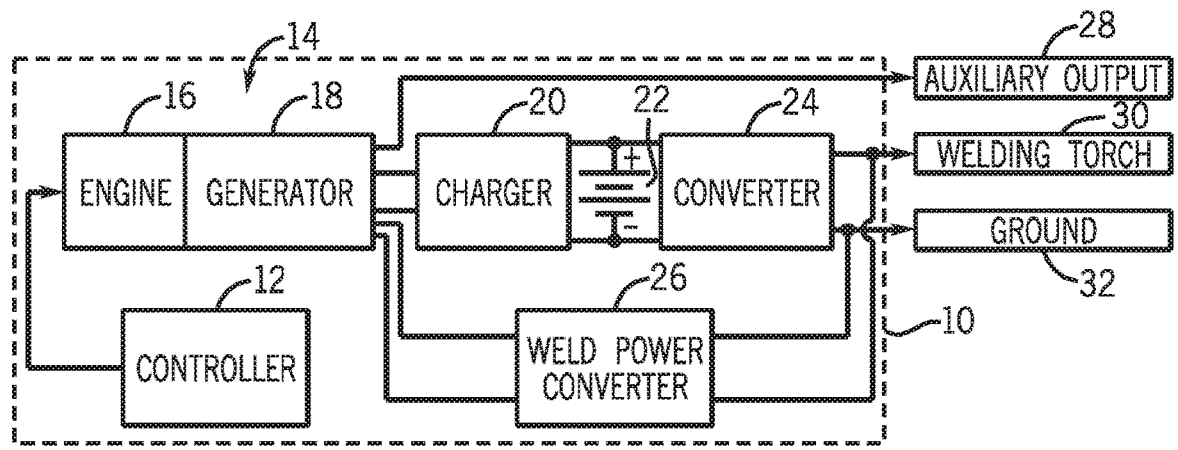
FIG. 1 is a block diagram illustrating exemplary components of an incremental hybrid welding power supply in accordance with aspects of the present invention.

In the embodiments described herein, for example in the embodiment of FIG. 1, the hybrid welding systems are shown in the context of a welding system (e.g., a metal inert gas (MIG) welding system) including a welding torch. However, as used herein, the term "welding operation" refers to conventional welding processes (e.g., MIG welding) as well as cutting operations and gouging operations. Similarly, as used herein, the term "weld power output" may refer to a power output fro a welding process, a cutting process or a gouging process. Indeed, embodiments of the disclosed hybrid welding systems may be provide power in an incremental manner for a welding process, a cutting process, or any other suitable welding operation.

Turning now to the drawings, FIG. 1 illustrates an exemplary hybrid welding power supply 10 adapted to incrementally initiate one or more of a variety of power outputs. To this end, the illustrated hybrid power supply 10 includes a controller 12, an engine-generator unit 14 including an engine 16 and a generator 18, a charger 20, a battery 22, a converter 24, and a weld power converter 26. The hybrid power supply 10 includes output terminals coupling to an auxiliary output 28, a welding output 30 illustrated as a welding torch, and a ground 32.

In the illustrated embodiment, the engine-generator unit 14 and the battery 22 are each coupled to a separate power converter, weld power converter 26 and converter 24, respectively. However, in further embodiments, a single power converter may be configured to receive power from both the engine-generator unit 14 and the battery 22 and to convert such incoming power to one or more appropriate power outputs. Still further, the illustrated embodiment shows the engine-generator unit 14, the weld power converter 26, the battery 22, and the converter 24 housed in a single mechanical enclosure. However, in further embodiments, such components may be coupled together in mechanical enclosures in any of a variety of suitable ways. For example, in one embodiment, the engine-generator unit 14 may be coupled with the weld power converter 26 in one enclosure, and the battery 22 and the converter 24 may be housed in another mechanical enclosure. In such an embodiment, the separate mechanical enclosures may be coupled via cabling through the welding environment.

During operation, the hybrid welding power supply 10 is configured to meet the commanded power levels of the welding operation in an incremental manner, as described in detail below. Such commanded power output levels may be commanded based on one or more of amperage, voltage, wire type, wire feed speed, stick electrode diameter, and so forth. As such, the engine 16 is configured to drive the generator 18 to produce power, which may be utilized to provide the auxiliary output 28, to charge the battery 22 via charger 20, and/or to power the weld output via the weld power converter 26. In some embodiments, the engine 16 may have a rating of below approximately 75 hp, below approximately 55 hp, below approximately 45 hp, below approximately 35 hp, below approximately 25 hp, below approximately 15 hp, or below approximately 5 hp. For example, for high power welding operations (e.g., cutting or gouging operations) the engine may have a rating of up to approximately 75 hp such that the engine is configured to meet the high power demands of the welding operation.

Further, the battery 22 is configured to discharge to produce power, which may be routed to the welding torch 30 via converter 24 and/or to cutting and/or gouging torches and/or auxiliary power through appropriate converters, such as to a synthetic auxiliary output. The controller 12 is configured to receive input (e.g., sensor feedback, manual inputs, etc.) regarding the process operation and to selectively access power from the engine-generator unit 14 and the battery 22 to produce power as needed. For example, such an embodiment may be applicable in instances of low frequency, high peak power demands in which the engine-generator output is supplemented by the energy storage device output. In such embodiments, the energy storage device may be recharged during instances of lower power demands from either the engine-generator unit or from another power source when the engine-generator unit is OFF.

For instance, in one embodiment, the controller 12 may be adapted to access power from the battery 22 to produce a power output to meet a commanded output level (e.g., the desired output as specified by an operator via a control on the welder) when the commanded output level is below a first predetermined threshold (e.g., 150 amps) and to activate the engine-generator unit 14 to produce power only when the commanded output exceeds the predetermined threshold (e.g., 150 amps). In such embodiments, when the commanded output exceeds the predetermined threshold, no power may be drawn from the battery and the engine-generator unit 14 may power not only the commanded load but also the recharging of the battery 22. Still further, the controller may access power from both the battery 22 and the engine-generator unit 14 to meet the commanded output when the commanded output exceeds a second threshold (e.g., 300 amps). As such, the controller 12 may be adapted to implement an incremental power access method to ensure that the commanded outputs of the welding operation are met in an efficient manner. Furthermore, such an incremental approach to control of the hybrid welding system may allow for the engine to be small, for example, rated for less than approximately 25 horsepower, while maintaining the ability to handle large loads (e.g., above approximately 300 amps).

Figure 2:
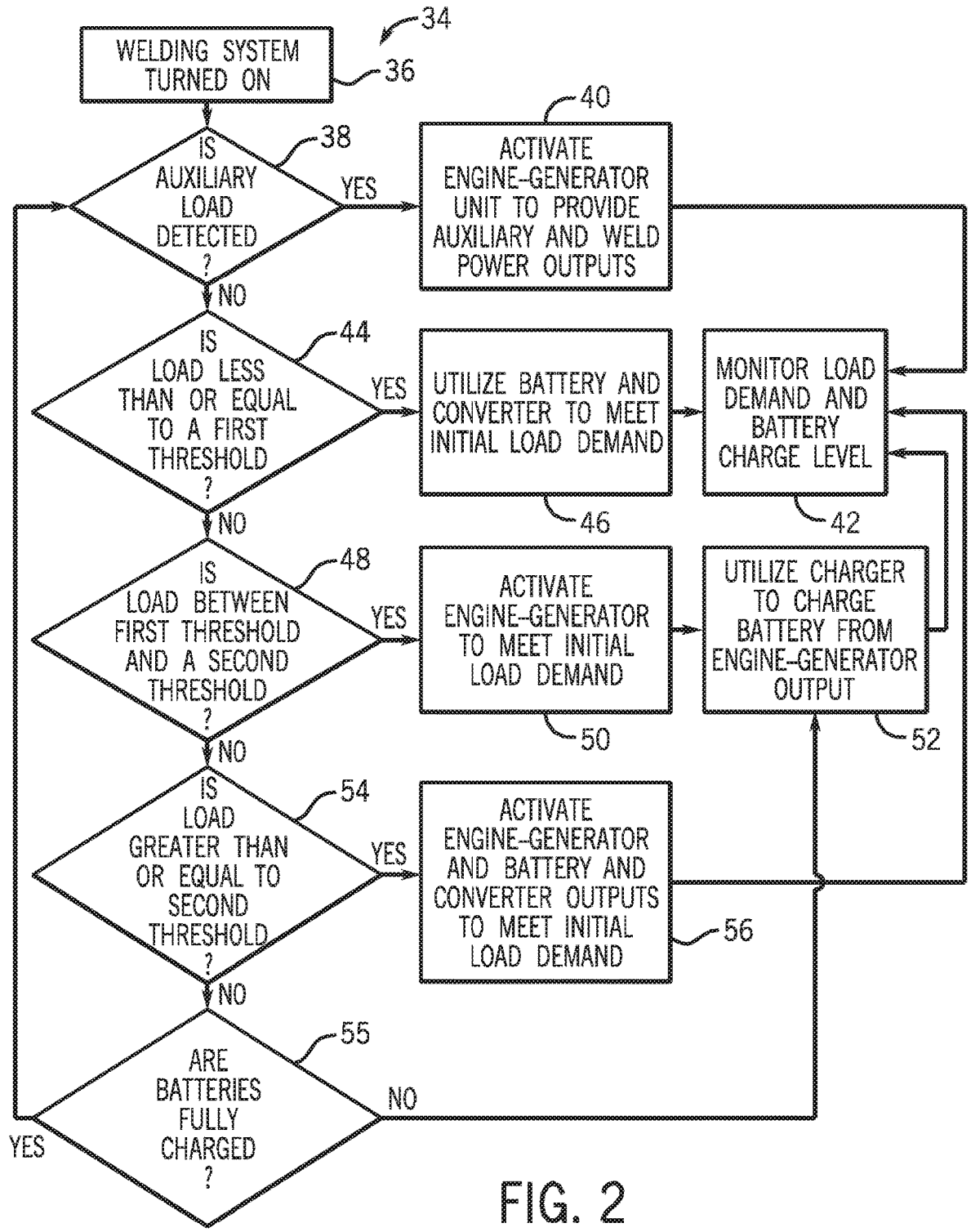
FIG. 2 is an exemplary method of controlling the incremental hybrid power supply of FIG. 1 in accordance with aspects of the present invention.

FIG. 2 illustrates an incremental control method 34 that may be utilized by the controller 12 to control operation of the hybrid welding power supply 10 of FIG. 1. The method includes the step of identifying that the welding system has been turned ON (block 36), for example, by identifying that an operator has switched the power switch to the ON configuration on the control panel of the welding power supply. The method 34 further includes checking for the presence of an auxiliary load (block 38). In the illustrated embodiment, if an auxiliary load is detected, the engine-generator unit is activated to meet the auxiliary load demand and any other commanded weld outputs that may be present (block 40). Subsequently, the controller continues to monitor the auxiliary load demand, the commanded weld outputs, and the battery charge level to determine when to activate and deactivate the engine-generator unit as the welding operation proceeds (block 42). However, it should be noted that although in this embodiment, the engine-generator is activated upon detection of an auxiliary load demand, in other embodiments, the controller may meet the auxiliary demand without activation of the engine-generator unit. For example, a synthetic auxiliary output may be provided, for example, via access to power from the battery, as described in detail below.

The illustrated method 34 further includes checking if a present commanded weld output is less than or equal to a first threshold (block 44). For example, in one embodiment, the controller may check if the commanded weld output is less than 150 amps, although in other embodiments the first threshold may be any predetermined level suitable for the given application. If the commanded output is less than or equal to the first threshold, power is accessed from the battery 22 and the converter 24 to meet the initial commanded output (block 46). That is, in such instances, the engine-generator unit may remain OFF while the battery is utilized to meet the commanded output. Such a feature may reduce the amount of fuel consumed to power the welding operation as compared to non-hybrid systems that run the engine-generator unit continuously to meet all commanded outputs and to traditional hybrid systems that allow the engine to idle while the battery provides power. Subsequently, the controller 12 continues to monitor the various commanded outputs present at one or more output terminals of the power supply as well as the battery charge level (block 42) to determine further access to power from the battery output and the engine-generator output.

If the load is not less than or equal to the first threshold, the controller checks if the load is between the first threshold and a second threshold (block 48). For example, in one embodiment, the controller may check if the load is between approximately 150 amps and approximately 300 amps. If the load is within the threshold values for the given application, the controller activates the engine-generator unit to output power to meet the demand (block 50) and to charge the battery (block 52) if the battery is below a full charge level. Subsequently, the controller monitors for further commanded outputs and the battery charge level (block 42).

Alternatively, in another embodiment, the controller may check if the commanded power output level is below the second threshold and, if so, the controller may activate the engine-generator unit to meet the commanded level without activation of the battery. The controller may then further check if the commanded output level is greater than or equal to the second threshold and, if so, the battery may be activated to supplement the engine-generator output. That is, in some embodiments, the engine-generator may be utilized to meet small commanded output levels (e.g., below a preset threshold), and the battery may be activated to produce a power output that is coupled with the engine-generator output when the preset threshold is exceeded.

In the illustrated embodiment, if the load is not within the first threshold and the second threshold, the controller checks if the load is greater than or equal to the second threshold (block 54). If so, the controller controls access to power from the engine-generator unit 14 as well as the battery 22 coupled to the converter 24 to meet the commanded output (block 56). That is, if the necessary power output exceeds that which the engine-generator unit 14 or the battery 22 is capable of exclusively outputting, the power outputs of both units are coupled together to provide the appropriate output. Such outputs may be coupled in any of a variety of suitable ways (e.g., supplement a constant engine-generator output with a battery output, supplement a constant battery output with engine-generator support, etc.), as described in detail below. If the load is not greater than or equal to the second threshold, the controller checks if the batteries are fully charge (block 55). If the batteries are not fully charged, the controller utilizes the charger to charge the batteries (block 52). If the batteries are fully charged, the controller again checks for the presence of an auxiliary load (block 38) as before.

Figure 3:
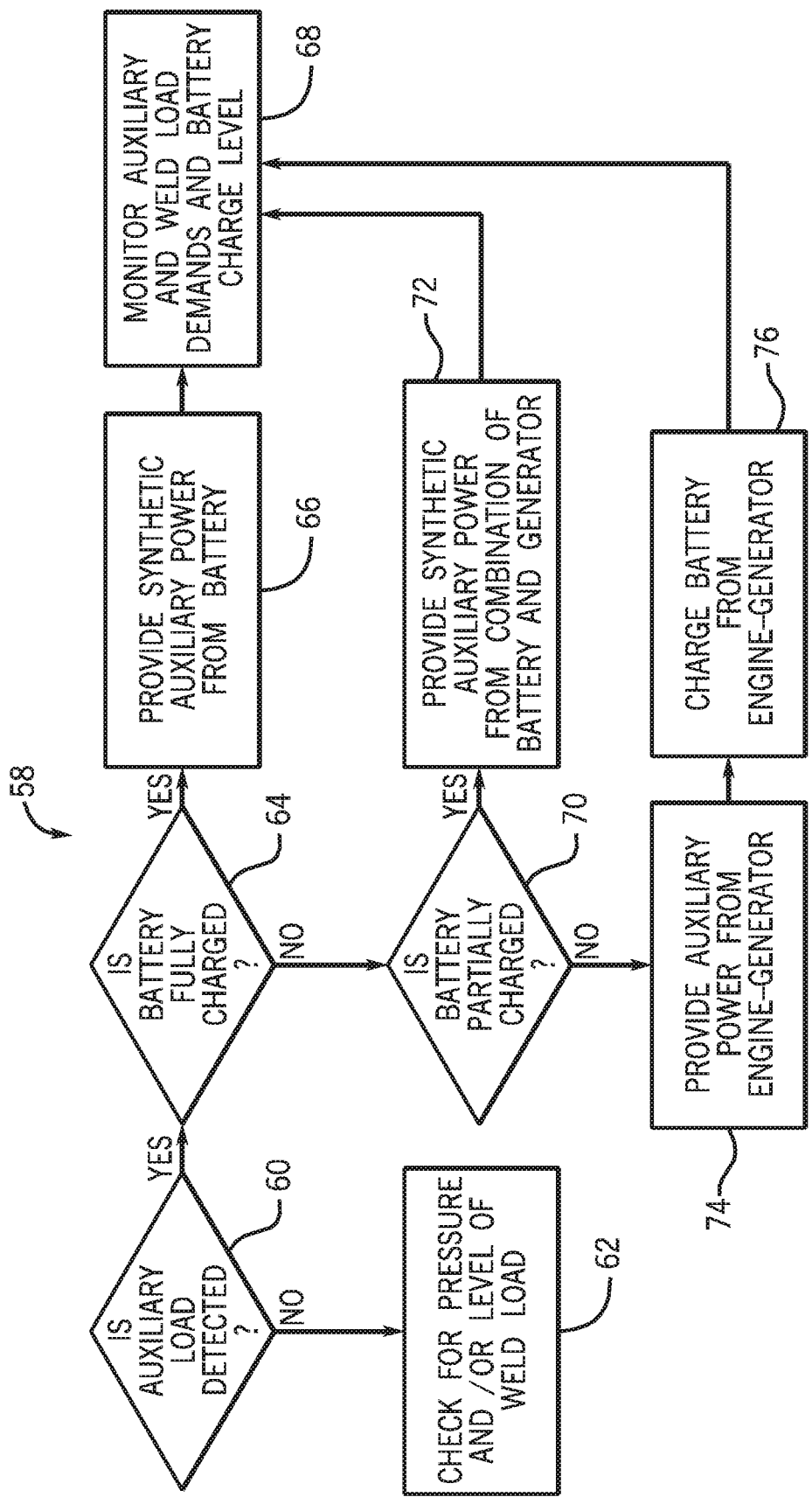
FIG. 3 illustrates exemplary control logic that may be utilized by the controller of the power supply of FIG. 1 to meet an auxiliary load demand.

FIG. 3 illustrates alternate auxiliary control logic 58 that may be employed to meet an auxiliary load demand. The method 58 includes checking for detection of an auxiliary load (block 60). If an auxiliary load is not detected, the controller proceeds to check for the presence and/or level of a weld load (block 62) and controls the engine-generator and battery as appropriate to meet the detected weld load, as before. If an auxiliary load is detected, the method 58 includes checking if the battery is fully charge (block 64). If so, the controller controls access to power from the battery to provide a synthetic auxiliary power output to meet the commanded output (block 66) and then continues to monitor the auxiliary load, the weld power load, and the battery charge level (block 68).

If the battery is not fully charged, the controller checks if the battery is at least partially charged (block 70). If so, the controller determines whether the battery charge level is enough to meet the desired auxiliary output and utilizes either the battery output or the battery output combined with an engine-generator output to provide the appropriate level of synthetic auxiliary output (block 72). As before, the controller then monitors for further loads and the battery charge level (block 68). If the battery is not partially charged, the controller activates the engine-generator to provide the appropriate level of auxiliary power (block 74) and additional output power to recharge the depleted battery (block 76). Again, the controller monitors the appropriate welding process parameters to determine further control of the hybrid welding power supply (block 68).

Figure 4:
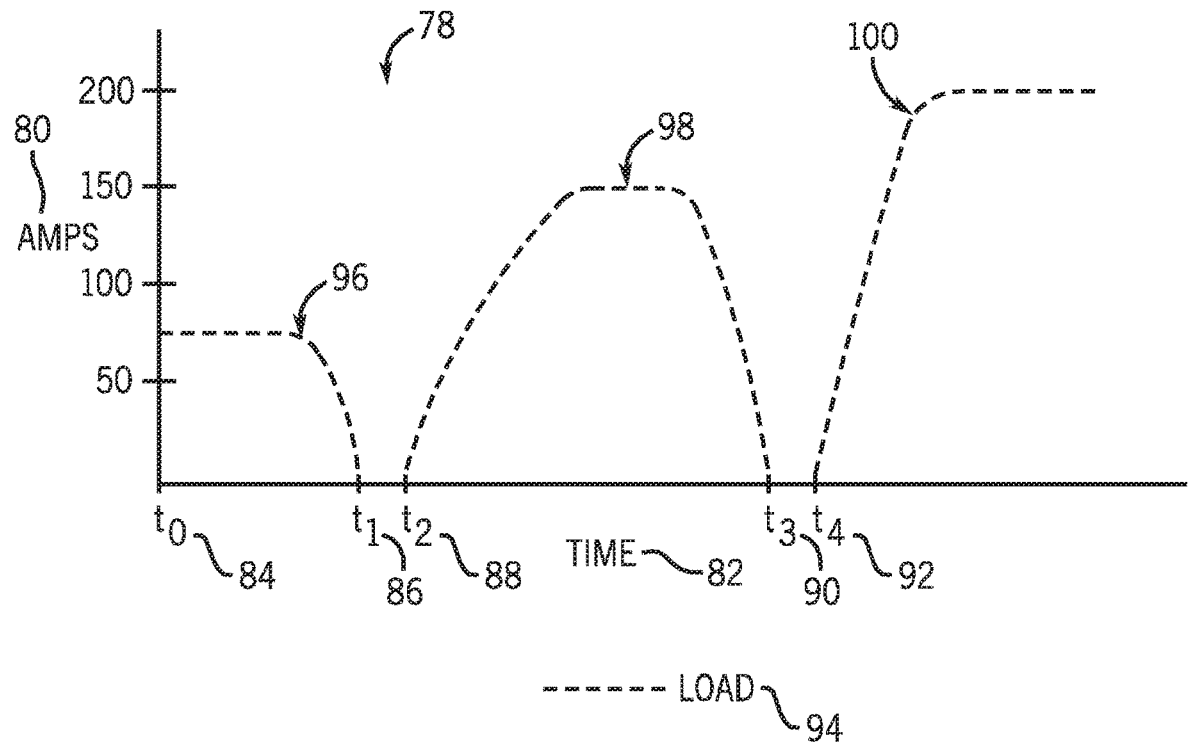
FIG. 4 is a graph illustrating an exemplary load detected at an output terminal of the incremental hybrid power supply of FIG. 1.

FIG. 4 is a graph 78 illustrating an exemplary load detected at an output terminal of the incremental hybrid power supply of FIG. 1. Specifically, the graph 78 includes an amperage axis 80 and a time axis 82. The time axis 82 includes a zero time point 84, a first time point 86, a second time point 88, a third time point 90, and a fourth time point 92. The graph 78 includes an exemplary load plot 94 illustrating an exemplary weld demand over a welding interval. The load plot 94 includes a first portion 96, a second portion 98, and a third portion 100.

In the illustrated embodiment, the commanded output begins at approximately 75 amps at initial time 84, thus prompting the controller to initiate output from the battery 22. Accordingly, during the interval from initial time 84 to the first time 86, the battery output satisfies the load requirement indicated by portion 96 of the load plot 94, and the engine-generator unit remains OFF, thus conserving fuel. At the first time 86, a break in welding occurs, and the controller may activate the engine-generator unit to recharge the battery. At the second time 88, the battery again outputs power to meet the commanded output and the engine-generator unit remains OFF. Between the second time 88 and the third time 90, the load plot 94 reaches 150 amps during portion 98 before another break in welding occurs at the third time 90. In the illustrated embodiment, 150 amps is a threshold level beyond which the engine-generator unit is activated to meet further commanded outputs. Accordingly, at the third time, when a break in welding occurs, the engine-generator unit is powered ON.

The engine-generator unit recharges the battery between the third time 90 and the fourth time 92 and remains ON to meet the commanded output during portion 100 of the plot. Additionally, after the fourth time 92, the battery remains OFF and recharges from the engine-generator output. In such a way, in some embodiments, the controller may shift from battery provided power to engine-generator provided power during one or more breaks in the welding process. Additionally, in some embodiments, during non-welding periods, the engine-generator may be turned OFF, thus conserving fuel. At the initiation of welding after the non-welding period, the controller may meet the initial commanded output with battery power output until the engine-generator power is once again needed.

Figure 5:
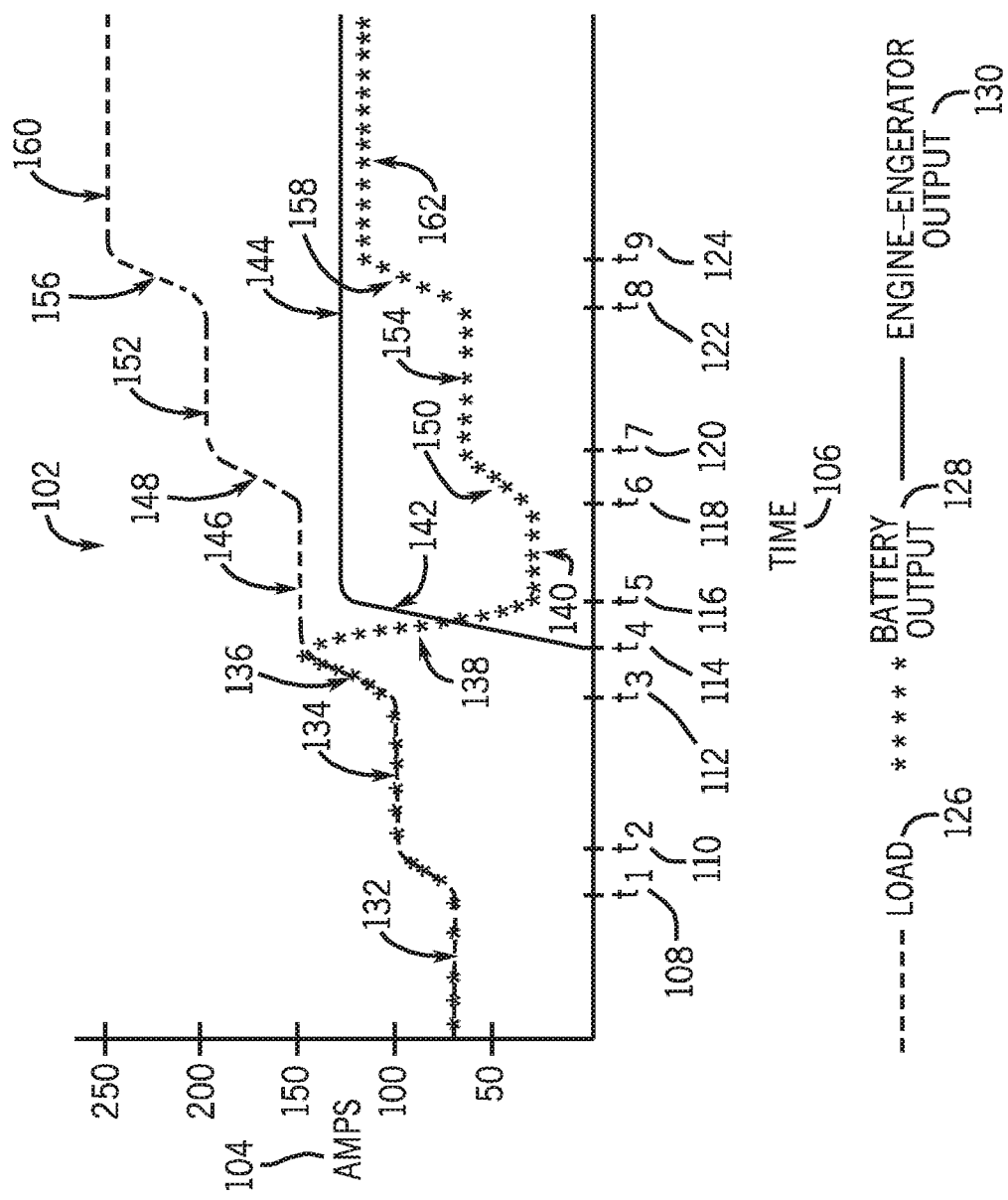
FIG. 5 is a graph illustrating an exemplary detected load, an exemplary battery output, and an exemplary engine-generator output in accordance with aspects of the present invention.

FIG. 5 is a graph 102 illustrating exemplary operation of the hybrid power supply of FIG. 1. Specifically, the graph 102 includes an amperage axis 104 and a time axis 106. The time axis 106 includes a first time 108, a second time 110, a third time 112, a fourth time 114, a fifth time 116, a sixth time 118, a seventh time 120, an eighth time 122, and a ninth time 124. The graph 102 includes a detected load plot 126, a battery output plot 128, and an engine-generator output plot 130.

As illustrated, the graph 102 begins with the detected load at approximately 70 amps and the battery output also at approximately 70 amps to meet the load requirements, as shown in portion 132 of the graph 102. Between the first time 108 and the second time 110, the detected load increases and the battery output also increases to accommodate the increased commanded output. The battery continues to meet the commanded output between the second time 110 and the third time 112, as shown in portion 136 of the graph 102. At the fourth time 114, the illustrated demand reaches a critical point, 150 amps, thus triggering activation of the engine-generator output. In the illustrated embodiment, the engine-generator output increases to contribute power to meet the 150 amp demand while the battery output decreases between the fourth time 114 and the fifth time 116, as shown by portions 142 and 138 of the graph 102.

In this embodiment, the engine-generator output is maintained at a constant power output (e.g., approximately 130 amps) from the fifth time 116 until the commanded output again falls below 150 amps, as shown by portion 144 of the graph. That is, embodiments of the presently disclosed hybrid welding systems may provide for the engine-generator output to be maintained at a constant level. In such embodiments, the battery output power may fluctuate to ensure that the commanded output is properly met. For example, the battery power output is maintained at approximately 20 amps, as shown by portion 140, while the engine-generator output is maintained at 130 amps to meet the 150 amp commanded output, as shown by portion 146. For further example, as the commanded output increases during portion 148, the battery demand is increased in portion 150 to meet the difference between the power supplied by the engine-generator and the desired load. Similarly, the battery output provided in portion 154 makes up the difference between the 130 amps supplied by the engine-generator and the desired demand shown in portion 152. Once again, as the demand of the load increases in portion 156 to 250 amps in portion 160, the battery output increases in portion 158 to a new output level in portion 162. As such, the engine-generator output may be maintained at a constant level while the commanded output fluctuates, and the battery supplies additional power.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   an engine configured to drive a generator to produce engine power output, wherein the engine is rated below or equal to 25 horsepower;
   an energy storage device configured to provide storage device power output; and
   a controller configured to:
      control production of welding power output by conversion of a storage device output and engine power output based upon a plurality of stepwise thresholds of commanded welding power;
      command welding power output to be produced from the engine power output via a first power converter in response to the commanded welding power being below a first threshold of the plurality of stepwise thresholds; and
      command welding power output to be produced from both the storage device power output and the engine power output in response to the commanded welding power exceeding the first threshold of the plurality of stepwise thresholds.

2. The welding system of claim 1, wherein the first threshold of the plurality of stepwise thresholds is equal to 300 amps, and a second threshold of the plurality of stepwise thresholds is equal to 150 amps.

3. The welding system of claim 1, wherein the first power converter is coupled to the energy storage device to convert the storage device power output to the welding power output.

4. The welding system of claim 1, wherein the second power converter is coupled to the engine to convert the engine power output to at least one of the weld power output and an auxiliary power output.

5. The welding system of claim 1, wherein the controller is configured to command conversion of only storage device power output to produce the welding power output upon start up of the welding system and to allow a delay period to elapse before accessing engine power output from the engine.

6. The welding system of claim 1, wherein the controller is configured to access engine power output from the engine when a pause in the welding process is detected.

7. The welding system of claim 2, further comprising a charger coupled to the energy storage device and to the generator and configured to receive the engine power output from the generator and to charge the energy storage device with the received engine power output.

8. The welding system of claim 7, wherein the charger is configured to charge the energy storage device when the commanded welding power is between the first threshold and the second threshold of the plurality of stepwise thresholds.

9. The welding system of claim 1, wherein the controller is configured to deactivate the engine to prevent the generation of the engine power output during non-welding periods.

10. The welding system of claim 1, wherein the engine is further configured to provide engine power output for an auxiliary power output when an auxiliary load is detected.

11. A welding system, comprising:
   a first power converter configured to convert an engine power output from an engine that is configured to drive a generator to produce the engine power output, wherein the engine is rated below or equal to 25 horsepower;

a second power converter configured to convert a storage device power output from an energy storage device that is configured to provide the storage device power output; and a controller configured to:
command welding power output to be produced from the engine power output via the first power converter in response to the commanded welding power being below a first threshold of a plurality of stepwise thresholds; and
command welding power output to be produced from both the storage device power output and the engine power output from the first power converter and a second power converter, respectively, in response to the commanded welding power exceeding the first threshold of the plurality of stepwise thresholds.

12. The welding system of claim 11, wherein the controller is further configured to control an auxiliary power output by conversion of one of the storage device output or the engine power output from the first or second power converters, respectively, based upon a plurality of stepwise thresholds of commanded welding power.

13. The welding system of claim 12, wherein the controller is further configured to control the energy storage device to discharge to produce the auxiliary power output.

14. The welding system of claim 11, wherein the first threshold of the plurality of stepwise thresholds is equal to 300 amps, and a second threshold of the plurality of stepwise thresholds is equal to 150 amps.

15. The welding system of claim 11, further comprising a charger coupled to the energy storage device and to the generator and configured to receive the engine power output from the generator and to charge the energy storage device with the received engine power output.

16. The welding system of claim 11, wherein the controller is further configured to control access to the storage device power output from the energy storage device and control the engine power output from the engine and production of welding power output in response to the plurality of stepwise thresholds.

17. A welding system, comprising:
an engine configured to drive a generator to produce an engine power output, wherein the engine is rated below or equal to 25 horsepower;
an energy storage device configured to provide a storage device power output;
a controller configured to:
control access to the storage device power output from the energy storage device and an engine power output from the engine;
control production of welding power output and auxiliary power output by conversion of the storage device output and engine power output based upon a plurality of stepwise thresholds of commanded welding power;
command welding power output and auxiliary power output to be produced from the engine power output via a first power converter in response to the commanded welding power being below a first threshold of the plurality of stepwise thresholds; and
command welding power output to be produced from both the storage device power output and the engine power output in response to a the commanded welding power exceeding the first threshold of the plurality of stepwise thresholds.

18. The welding system of claim 17, wherein the first threshold of the plurality of stepwise thresholds is equal to 300 amps, and the second threshold of the plurality of stepwise thresholds is equal to 300 amps.

19. The welding system of claim 17, further comprising a charger coupled to the energy storage device and to the engine and configured to receive the engine power output from the engine and to charge the energy storage device with the received engine power output.

20. The welding system of claim 17, wherein the controller is further configured to activate and deactivate the engine to access the engine power output and to charge the energy storage device in response to the plurality of stepwise thresholds.

* * * * *